US010211855B2

(12) United States Patent
Baringer et al.

(10) Patent No.: US 10,211,855 B2
(45) Date of Patent: Feb. 19, 2019

(54) APPARATUS FOR MULTI CARRIER AGGREGATION IN A SOFTWARE DEFINED RADIO

(71) Applicant: GM GLOBAL TECHNOLOGY OPERATIONS LLC, Detroit, MI (US)

(72) Inventors: Cynthia D. Baringer, Piedmont, CA (US); Mohiuddin Ahmed, Moorpark, CA (US); Hsuanyu Pan, Los Angeles, CA (US); Yen-Cheng Kuan, Los Angeles, CA (US); James Chingwei Li, Simi Valley, CA (US); Emilio A. Sovero, Thousands Oaks, CA (US); Timothy J. Talty, Beverly Hills, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 73 days.

(21) Appl. No.: 15/407,679

(22) Filed: Jan. 17, 2017

(65) Prior Publication Data
US 2018/0205399 A1    Jul. 19, 2018

(51) Int. Cl.
*H04W 80/04*    (2009.01)
*H04B 1/00*    (2006.01)
*H04J 1/20*    (2006.01)

(52) U.S. Cl.
CPC ............... *H04B 1/001* (2013.01); *H04J 1/20* (2013.01)

(58) Field of Classification Search
CPC .................................. H04J 1/20; H04W 80/04
See application file for complete search history.

(56) References Cited

U.S. PATENT DOCUMENTS

| 9,065,472 | B1* | 6/2015 | McCue | H03M 3/404 |
|---|---|---|---|---|
| 2006/0112406 | A1* | 5/2006 | Soundararajan | H04N 7/141 725/38 |
| 2008/0318620 | A1* | 12/2008 | van Waasen | H04L 27/362 455/552.1 |
| 2013/0242784 | A1* | 9/2013 | Tujkovic | H04W 24/02 370/252 |
| 2013/0271221 | A1* | 10/2013 | Levesque | H03F 3/193 330/294 |
| 2014/0169317 | A1* | 6/2014 | Gao | H04B 7/0404 370/329 |
| 2016/0173269 | A1* | 6/2016 | Kuttner | H04L 7/0083 375/347 |

* cited by examiner

*Primary Examiner* — Chi Ho A Lee

(57) ABSTRACT

A apparatus for dynamically modifying filter characteristics of a delta-sigma modulator in order to receive and transmit radio frequency signals over a wide frequency range. The system is used for wide bandwidth radio system designed to adapt to various global radio standards and, more particularly, to a cellular radio architecture that employs a combination of a single circulator, programmable band-pass sampling radio frequency (RF) front-end and optimized digital baseband that is capable of supporting all current cellular wireless access protocol frequency bands.

16 Claims, 6 Drawing Sheets

400

APPARATUS FOR MULTI CARRIER AGGREGATION IN A SOFTWARE DEFINED RADIO

BACKGROUND OF THE INVENTION

Field of the Invention

The present application generally relates to wide bandwidth radio system designed to adapt to various global radio standards and, more particularly, to a cellular radio architecture that employs a combination of a single or multiple circulator, or n-plexers, programmable band-pass sampling radio frequency (RF) front-end and optimized digital baseband that is capable of supporting all current cellular wireless access protocol frequency bands. The system and method incorporate a data converter that can simultaneously equalize and noise shape the incoming signals by incorporating a channel equalizer into a sigma delta data converter.

Discussion of the Related Art

Traditional cellular telephones employ different modes and bands of operation that have been supported in hardware by having multiple disparate radio front-end and baseband processing chips integrated into one platform, such as triband or quad-band user handsets supporting global system for mobile communications (GSM), general packet radio service (GPRS), etc. Known cellular receivers have integrated some of the antenna and baseband data paths, but nevertheless the current state of the art for mass mobile and vehicular radio deployment remains a multiple static channelizing approach. Such a static architecture is critically dependent on narrow-band filters, duplexers and standard-specific down-conversion to intermediate-frequency (IF) stages. The main disadvantage of this static, channelized approach is its inflexibility with regards to the changing standards and modes of operation. As the cellular communications industry has evolved from 2G, 3G, 4G and beyond, each new waveform and mode has required a redesign of the RF front-end of the receiver as well as expanding the baseband chip set capability, thus necessitating a new handset. For automotive applications, this inflexibility to support emerging uses is prohibitively expensive and a nuisance to the end-user.

Providing reliable automotive wireless access is challenging from an automobile manufacturers point of view because cellular connectivity methods and architectures vary across the globe. Further, the standards and technologies are ever changing and typically have an evolution cycle that is several times faster than the average service life of a vehicle. More particularly, current RF front-end architectures for vehicle radios are designed for specific RF frequency bands. Dedicated hardware tuned at the proper frequency needs to be installed on the radio platform for the particular frequency band that the radio is intended to operate at. Thus, if cellular providers change their particular frequency band, the particular vehicle that the previous band was tuned for, which may have a life of 15 to 20 years, may not operate efficiently at the new band. Hence, this requires automobile manufactures to maintain a myriad of radio platforms, components and suppliers to support each deployed standard, and to provide a path to upgradability as the cellular landscape changes, which is an expensive and complex proposition.

Known software-defined radio architectures have typically focused on seamless baseband operations to support multiple waveforms and have assumed similar down-conversion-to-baseband specifications. Similarly, for the transmitter side, parallel power amplifier chains for different frequency bands have typically been used for supporting different waveform standards. Thus, receiver front-end architectures have typically been straight forward direct sampling or one-stage mixing methods with modest performance specifications. In particular, no prior application has required a greater than 110 dB dynamic range with associated IP3 factor and power handling requirements precisely because such performance needs have not been realizable with complementary metal oxide semiconductor (CMOS) analog technologies. It has not been obvious how to achieve these metrics using existing architectures for CMOS devices, thus the dynamic range, sensitivity and multi-mode interleaving for both the multi-bit analog-to-digital converter (ADC) and the digital-to-analog converter (DAC) is a substantially more difficult problem.

Delta-sigma modulators are becoming more prevalent in digital receivers because, in addition to providing wideband high dynamic range operation, the modulators have many tunable parameters making them a good candidate for reconfigurable systems. In particular, delta-sigma modulators include a software tunable filter for noise shaping an incoming RF signal. It would be desirable to utilize the software programmable nature of the delta-sigma modulator to further reduce the processing load of a system digital signal processor.

SUMMARY OF THE INVENTION

The present disclosure describes an apparatus comprising an antenna for receiving a first RF signal, a second RF signal, a third RF signal and a fourth RF signal, a first bank of delta sigma analog to digital converters having a first delta sigma analog to digital converter for generating a first digital signal and a second delta signal analog to digital converter for generating a second digital signal, a second bank of delta sigma analog to digital converters having a third delta sigma analog to digital converter for generating a third digital signal and a fourth delta signal analog to digital converter for generating a fourth digital signal, a first multiplexer having a first passband and a second passband, wherein the first multiplexer is operative to couple the first RF signal to a first delta sigma analog to digital converter, where the first RF signal has a first center frequency within the first passband, and wherein the first multiplexer is further operative to couple the second RF signal to a second delta sigma analog to digital converter, where the second RF signal has a second center frequency within the second passband, a second multiplexer having a third passband and a fourth passband, wherein the second multiplexer is operative to couple the third RF signal to a third delta sigma analog to digital converter, where the third RF signal has a third center frequency within the third passband, and wherein the first multiplexer is further operative to couple the fourth RF signal to a fourth delta sigma analog to digital converter, where the fourth RF signal has a fourth center frequency within the fourth passband, a first switch for coupling the first RF signal and the second RF signal to the first multiplexer and for coupling the third RF signal and the fourth RF signal to the second multiplexer, a processor for generating a communications data in response to at least one of the first digital signal, the second digital signal, the third digital signal and the fourth digital signal to the processor, and a second switch for coupling at least one of the first digital signal, the second digital signal, the third digital signal and the fourth digital signal to the processor. Multiplex, and n-plexer, as used here, is a generic term for devices that splits signals into different frequency bands and also separated or isolates transmit and receive signals.

Another aspect of the present disclosure describes an apparatus comprising an input for receiving a first RF signal and a second RF signal, a power amplifier for amplifying the first RF signal and the second RF signal, a source of an LO signal, a mixer for generating a first IF signal in response to the first RF signal and the LO signal and a second IF signal in response to the second RF signal and the LO signal, a first delta sigma analog to digital converter to generate a first digital signal in response to the first IF signal, a second delta sigma analog to digital converter to generate a second digital signal in response to the second IF signal, and a multiplexer having a first passband and a second passband, wherein the first multiplexer is operative to couple the first IF signal to the first delta sigma analog to digital converter, where the first IF signal has a first center frequency within the first passband, and wherein the first multiplexer is further operative to couple the second IF signal to the second delta sigma analog to digital converter, where the second IF signal has a second center frequency within the second passband.

Another aspect of the present disclosure describes an apparatus comprising an antenna for transmitting a first amplified RF signal and a second amplified RF signal, a processor for generating a first digital signal in response to a data packet, a delta signal digital to analog converter for converting the first RF signal into a first RF signal in response to a first control signal and a second RF signal in response to a second control signal, a first amplifier for amplifying the first RF signal to generate the first amplified RF signal, a second amplifier for amplifying the second RF signal to generate the second amplified RF signal, a first multiplexer for filtering the first amplified RF signal, a second multiplexer for filtering the second amplified RF signal, and an RF switch for coupling the first amplified RF signal and the second amplified RF signal to the antenna.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a cellular radio architecture is merely exemplary in nature, and is in no way intended to limit the invention or its applications or uses. For example, the radio architecture of the invention is described as having application for a vehicle. However, as will be appreciated by those skilled in the art, the radio architecture may have applications other than automotive applications.

The cellular radio architectures discussed herein are applicable to more than cellular wireless technologies, for example, WiFi (IEEE 802.11) technologies. Further, the cellular radio architectures are presented as a fully duplexed wireless system, i.e., one that both transmits and receives. For wireless services that are receive only, such as global positioning system (GPS), global navigation satellite system (GNSS) and various entertainment radios, such as AM/FM, digital audio broadcasting (DAB), SiriusXM, etc., only the receiver design discussed herein would be required. Also, the described radio architecture design will enable one radio hardware design to function globally, accommodating various global wireless standards through software updates. It will also enable longer useful lifespan of the radio hardware design by enabling the radio to adapt to new wireless standards when they are deployed in the market. For example, 4G radio technology developments and frequency assignments are very dynamic. Thus, radio hardware deployed in the market may become obsolete after just one or two years. For applications, such as in the automotive domain, the lifespan can exceed ten years. This invention enables a fixed hardware platform to be updateable through software updates, thus extending the useful lifespan and global reuse of the hardware.

Figure 1:
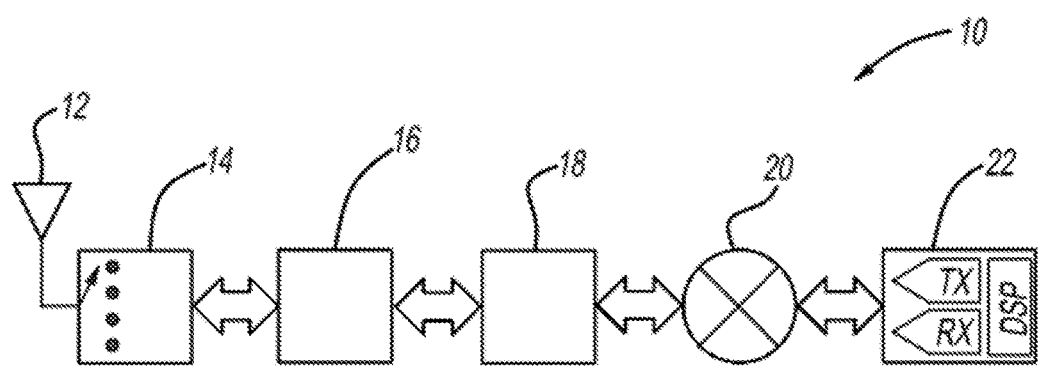
FIG. 1 shows a block diagram of a known multi-mode, multi-band cellular communications handset architecture.

FIG. 1 is a block diagram of a known multi-mode, multi-band cellular communications user handset architecture 10 for a typical cellular telephone. The architecture 10 includes an antenna structure 12 that receives and transmits RF signals at the frequency band of interest. The architecture 10 also includes a switch 14 at the very front-end of the architecture 10 that selects which particular channel the transmitted or received signal is currently for and directs the signal through a dedicated set of filters and duplexers represented by box 16 for the particular channel. Modules 18 provide multi-mode and multi-band analog modulation and demodulation of the receive and transmit signals and separates the signals into in-phase and quadrature-phase signals sent to or received from a transceiver 20. The transceiver 20 also converts analog receive signals to digital signals and digital transmit signals to analog signals. A baseband digital signal processor 22 provides the digital processing for the transmit or receive signals for the particular application.

Figure 2:
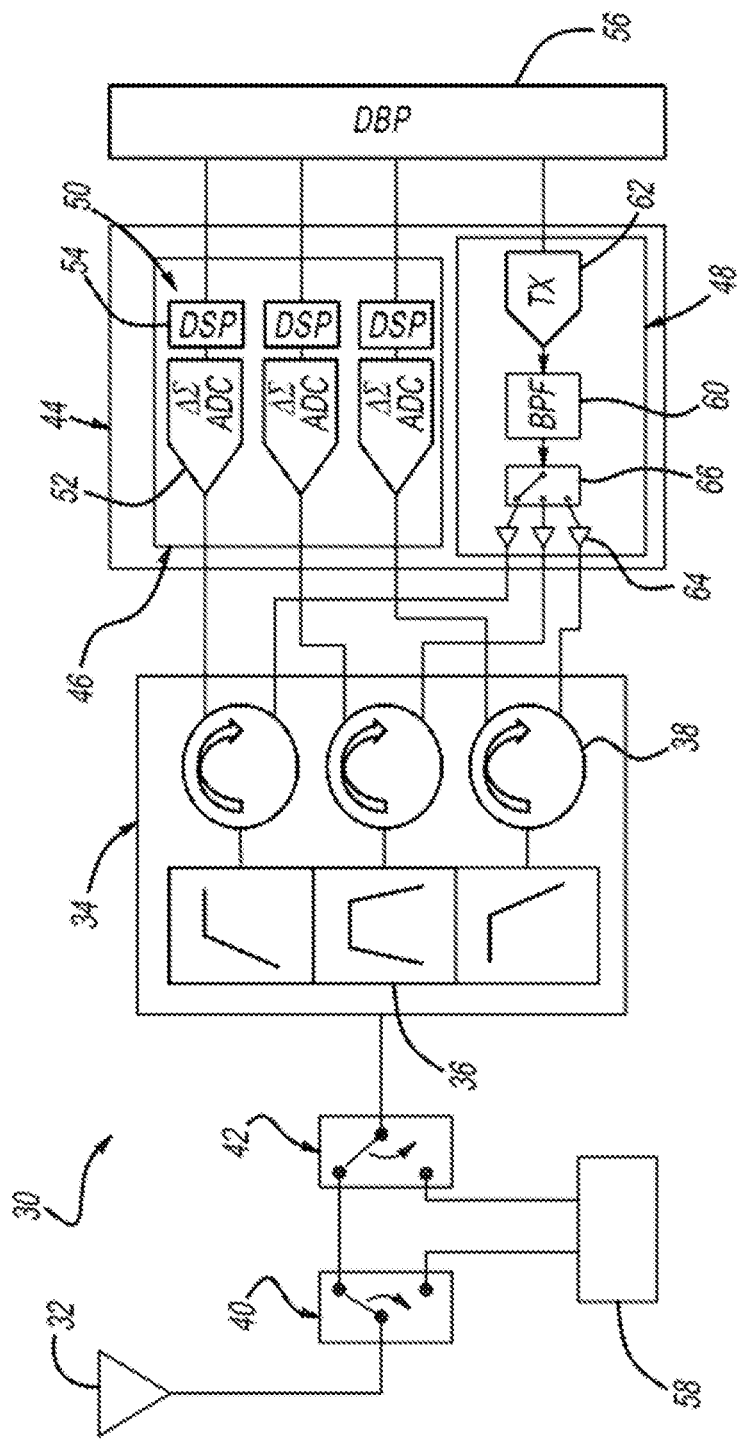
FIG. 2 shows a block diagram of a software-programmable cellular radio architecture applicable.

FIG. 2 is a schematic block diagram of a cellular radio front-end architecture 30 that provides software programmable capabilities as will be discussed in detail below. The architecture 30 includes an antenna structure 32 capable of receiving and transmitting the cellular frequency signals discussed herein, such as in a range of 400 MHz-3.6 GHz. Signals received and transmitted by the antenna structure 32 go through a multiplexer 34 that includes three signal paths, where each path is designed for a particular frequency band as determined by a frequency selective filter 36 in each path. In this embodiment, three signal paths have been selected, however, the architecture 30 could be expanded to any number of signal paths. Each signal path includes a circulator 38 that separates and directs the receive and transmit signals, and provides isolation so that the high power signals being transmitted do not enter the receiver side and saturate the receive signals at those frequency bands.

The architecture 30 also includes a front-end transceiver module 44 that is behind the multiplexer 34 and includes a receiver module 46 that processes the receive signals and a transmitter module 48 that processes the transmit signals. The receiver module 46 includes three receiver channels 50, one for each of the signal paths through the multiplexer 34, where a different one of the receiver channels 50 is connected to a different one of the circulators 38, as shown. Each of the receiver channels 50 includes a delta-sigma modulator 52 that receives the analog signal at the particular frequency band and generates a representative stream of digital data using an interleaving process in connection with a number of N-bit quantizer circuits operating at a very high clock rate, as will be discussed in detail below. As will further be discussed, the delta-sigma modulator 52 compares the difference between the receive signal and a feedback signal to generate an error signal that is representative of the digital data being received. The digital data bits are provided to a digital signal processor (DSP) 54 that extracts the digital data stream. A digital baseband processor (DBP) 56 receives and operates on the digital data stream for further signal processing in a manner well understood by those skilled in the art. The transmitter module 48 receives digital data to be transmitted from the processor 56. The module 48 includes a transmitter circuit 62 having a delta-sigma modulator that converts the digital data from the digital baseband processor 56 to an analog signal. The analog signal is filtered by a tunable bandpass filter (BPF) 60 to remove out of band emissions and sent to a switch 66 that directs the signal to a selected power amplifier 64 optimized for the transmitted signal frequency band. In this embodiment, three signal paths have been selected, however, the transmitter module 48 could be implemented using any number of signal paths. The amplified signal is sent to the particular circulator 38 in the multiplexer 34 depending on which frequency is being transmitted.

As will become apparent from the discussion below, the configuration of the architecture 30 provides software programmable capabilities through high performance delta-sigma modulators that provide optimized performance in the signal band of interest and that can be tuned across a broad range of carrier frequencies. The architecture 30 meets current cellular wireless access protocols across the 0.4-2.6 GHz frequency range by dividing the frequency range into three non-continuous bands. However, it is noted that other combinations of signal paths and bandwidth are of course possible. The multiplexer 34 implements frequency domain de-multiplexing by passing the RF carrier received at the antenna structure 32 into one of the three signal paths. Conversely, the transmit signal is multiplexed through the multiplexer 34 onto the antenna structure 32. For vehicular wireless access applications, such a low-cost integrated device is desirable to reduce parts cost, complexity, obsolescence and enable seamless deployment across the globe.

The delta-sigma modulators 52 may be positioned near the antenna structure 32 so as to directly convert the RF receive signals to bits in the receiver module 46 and bits to an RF signal in the transmitter module 48. The main benefit of using the delta-sigma modulators 52 in the receiver channels 50 is to allow a variable signal capture bandwidth and variable center frequency. This is possible because the architecture 30 enables software manipulation of the modulator filter coefficients to vary the signal bandwidth and tune the filter characteristics across the RF band, as will be discussed below.

The architecture 30 allows the ability to vary signal capture bandwidth, which can be exploited to enable the reception of continuous carrier aggregated waveforms without the need for additional hardware. Carrier aggregation is a technique by which the data bandwidths associated with multiple carriers for normally independent channels are combined for a single user to provide much greater data rates than a single carrier. Together with MIMO, this feature is a requirement in modern 4G standards and is enabled by the orthogonal frequency division multiplexing (OFDM) family of waveforms that allow efficient spectral usage.

The architecture 30 through the delta-sigma modulators 52 can handle the situation for precise carrier aggregation scenarios and band combinations through software tuning of the bandpass bandwidth, and thus enables a multi-segment capture capability. Dynamic range decreases for wider bandwidths where more noise is admitted into the sampling bandpass. However, it is assumed that the carrier aggregation typically makes sense when the user has a good signal-to-noise ratio, and not cell boundary edges when connectivity itself may be marginal. Note that the inter-band carrier aggregation is automatically handled by the architecture 30 since the multiplexer 34 feeds independent modulators in the channels 50.

The circulators 38 route the transmit signals from the transmitter module 48 to the antenna structure 32 and also provide isolation between the high power transmit signals and the receiver module 46. Although the circulators 38 provide significant signal isolation, there is some port-to-port leakage within the circulator 38 that provides a signal path between the transmitter module 48 and the receiver module 46. A second undesired signal path occurs due to reflections from the antenna structure 32, and possible other components in the transceiver. As a result, a portion of the transmit signal will be reflected from the antenna structure 32 due to a mismatch between the transmission line impedance and the antenna's input impedance. This reflected energy follows the same signal path as the incoming desired signal back to the receiver module 46.

The architecture 30 is also flexible to accommodate other wireless communications protocols. For example, a pair of switches 40 and 42 can be provided that are controlled by the DBP 56 to direct the receive and transmit signals through dedicated fixed RF devices 58, such as a global system for mobile communications (GSM) RF front-end module or a WiFi front-end module. In this embodiment, some select signal paths are implemented via conventional RF devices. FIG. 2 only shows one additional signal path, however, this concept can be expanded to any number of additional signal paths depending on use cases and services.

Delta-sigma modulators are a well known class of devices for implementing analog-to-digital conversion. The fundamental properties that are exploited are oversampling and error feedback (delta) that is accumulated (sigma) to convert the desired signal into a pulse modulated stream that can subsequently be filtered to read off the digital values, while effectively reducing the noise via shaping. The key limitation of known delta-sigma modulators is the quantization noise in the pulse conversion process. Delta-sigma converters require large oversampling ratios in order to produce a sufficient number of bit-stream pulses for a given input. In direct-conversion schemes, the sampling ratio is greater than four times the RF carrier frequency to simplify digital filtering. Thus, required multi-GHz sampling rates have limited the use of delta-sigma modulators in higher frequency applications. Another way to reduce noise has been to use higher order delta-sigma modulators. However, while first order canonical delta-sigma architectures are stable, higher orders can be unstable, especially given the tolerances at higher frequencies. For these reasons, state of the art higher order delta-sigma modulators have been limited to audio frequency ranges, i.e., time interleaved delta-sigma modulators, for use in audio applications or specialized interleaving at high frequencies.

The filter characteristics of a Delta-Sigma modulator may effectively be modified in order to compensate for Doppler shift. Doppler shift occurs when the transmitter of a signal is moving in relation to the receiver. The relative movement shifts the frequency of the signal, making it different at the receiver than at the transmitter. An exemplary system according to the present disclosure leverages the software-defined radio architecture to quickly estimate a shift in the carrier frequency and re-center the filter before the signal is disrupted or degraded. In normal operation, the notch of the modulator filter is centered about the expected carrier frequency of the received signal with the signal band information centered around the carrier frequency and not exceeding the bandwidth of the modulator filter. A Doppler shift would offset the carrier by an amount $\Delta f$ causing potential degradation to signal content with an increase in noise at one side of the band. According to the method and system described herein, the transceiver in a wireless cellular communication system can adapt to changes in the RF carrier frequency and may maintain signal integrity, by shifting the filter notch by the same amount as the carrier frequency.

For the cellular application discussed herein that covers multiple assigned frequency bands, a transmitter with multi-mode and multi-band coverage is required. Also, many current applications mandate transmitters that rapidly switch between frequency bands during the operation of a single communication link, which imposes significant challenges to typical local oscillator (LO) based transmitter solutions. This is because the switching time of the LO-based transmitter is often determined by the LO channel switching time under the control of the loop bandwidth of the frequency synthesizer, around 1 MHz. Hence, the achievable channel switching time is around several microseconds, which unfortunately is too long for an agile radio. A fully digital PWM based multi-standard transmitter, known in the art, suffers from high distortion, and the channel switching time is still determined by the LO at the carrier frequency. A DDS can be used as the LO sourced to enhance the switching speed, however, this design consumes significant power and may not deliver a high frequency LO with low spurious components. Alternately, single sideband mixers can be used to generate a number of LOs with different center frequencies using a common phase-lock loop (PLL), whose channel switching times can be fast. However, this approach can only support a limited number of LO options and any additional channels to cover the wide range of the anticipated 4G bands would need extra mixtures. As discussed, sigma-delta modulators have been proposed in the art to serve as an RF transmitter to overcome these issues. However, in the basic architecture, a sigma-delta modulator cannot provide a very high dynamic range in a wideband of operations due to a moderate clock frequency. It is precisely because the clock frequency is constrained by current technology that this high frequency mode of operations cannot be supported.

Figure 3:
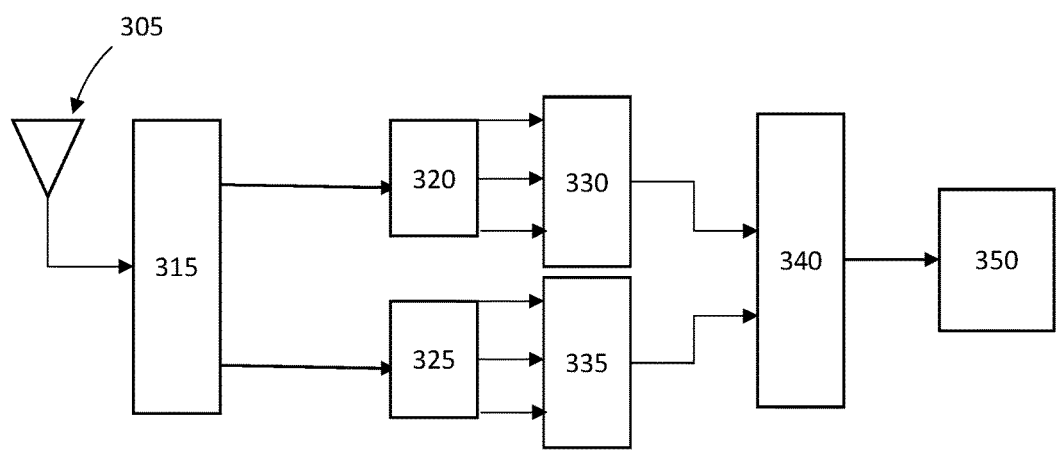
FIG. 3 shows an exemplary system for implementing multiple receive paths in a software defined radio.

Turning now to FIG. 3, an exemplary radio architecture 300 to implement software programmable cellular communication capability is shown. The radio architecture 330 may include an antenna 305, a multipole switch 315, a first multiplexer 320, a second multiplexer 325, a first bank of delta sigma analog to digital converters 330, a second bank of delta sigma analog to digital converters 335, a cross bar switch 340, and a processor 350, such as a baseband processor. The radio architecture is operative to extend the capability of our current radio architectures in order to support multi-input multi-output (MIMO) waveforms, massive carrier aggregation (CA) configurations, as well as operations above 3 GHz, such as those being considered for commercial Long Term Evolution (LTE) 5G systems.

The radio architecture 300 employs an alternating cascade and parallel assembly and integration of tunable sigma-delta data converters with multiplexers, crossbar switches and other components in a hybrid configuration. The system provides a desirable flexibility to capture disparate slices of the RF spectrum for parallel processing and thus support large combination of CA and MIMO waveforms for 5G and beyond, subject only to system power and size constraints. This configuration has the desirable attribute of being tunable over very wide frequency ranges. Employing this architecture using a number of these devices in a parallel bank configuration, coupled with a mixer based solution for greater than 3 GHz, such that the RF spectrum of interest is covered by one or more receive, or transmit, paths. In an exemplary configuration the appropriate RF paths can be made active with the data captured in multiple paths subsequently processed in the digital domain to combine the MIMO/CA streams.

Another desirable aspect to the exemplary radio architecture 300, is that the data capture method employ sigma-delta modulators. This simplifies the filtering architecture needed. Furthermore, the frequency domain shaping are performed via programmable components arranged in a flexible configuration. This facilitates arbitrary CA and MIMO support within the same physical hardware.

The radio architecture 300 uses an antenna 305 to transmit and receive the desired radio signals. The antenna may be a single antenna or a plurality of antennas in order to cover and efficiently transmit and receive RF signals over the entire desired frequency range. The radio architecture 300 further employs a multipole switch 315 operative to couple signals from the antenna 305 or plurality of antennas, to the appropriate multiplexer in response to the frequency of RF signal desired to be transmitted or received.

In an exemplary embodiment, the first multiplexer 320 and the second multiplexer 325, may operate as both a bank of diplexers and/or as a bank of duplexers. Thus, the multiplexers 320, 325 split incoming signals into multiple paths covering different frequency ranges, which may be implemented using bandpass filters, and also separates transmit from receive signals traversing through the device to share the same antenna 305. In an exemplary configuration, each of the multiplexers 320, 325 may have non-overlapping passband ranges. For example, the top block may cover frequency bins 1, 3, 5, 7, 9 whereas the bottom block may cover frequency bins 2, 4, 6, 8, 10. For example, the frequency range of bin 1 could be 700 MHz-900 MHz, bit 2 900 MHz-1100 MHz, bin 3 1000 MHz-1300 MHz, etc. The multiplexers 320 325 pass the desired RF signal passes through the frequency partitioning bins to a respective bank of tunable sigma-delta modulators 330 335, one for each multiplexer branch.

The delta sigma analog to digital converters 330 335, are operative to route and capture the RF signal being passed through each branch of the multiplexer and convert into a digital bit stream representing the waveform information being carried by the carrier in that frequency bin. The tunability of each sigma delta modulator enables coverage over the specific multiplexer branch it is attached to, and the aggregate bank of modulators and multiplexer branches provides coverage for all the massive carrier aggregation combinations. Finally the digital bit stream is fed into a cross bar switch 340 to ensure that each carrier aggregation stream is appropriately routed into the baseband for waveform processing and channel stitching by an appropriate processor 350, such as a digital signal processor. The size and structure of the switching mechanism is chosen in response to the number of carrier aggregation combinations the system is being designed for. In an exemplary configuration, the sigma delta modulators can tune Over a 400 MHz frequency span and can be placed in the low band (700 MHz-1.1 GHz), mid band (1700-2100 MHz) or high band (2200-2600 MHz). The multiplexer and switch can be configured to cover 3, 4, 5 or more independent signal paths spanning this entire range. Note that in contrast to current state of the art architectures, there are no static SAW/BAW filters needed, since it is a direct RF to digital SDR architecture using tunable data converters.

Figure 4:
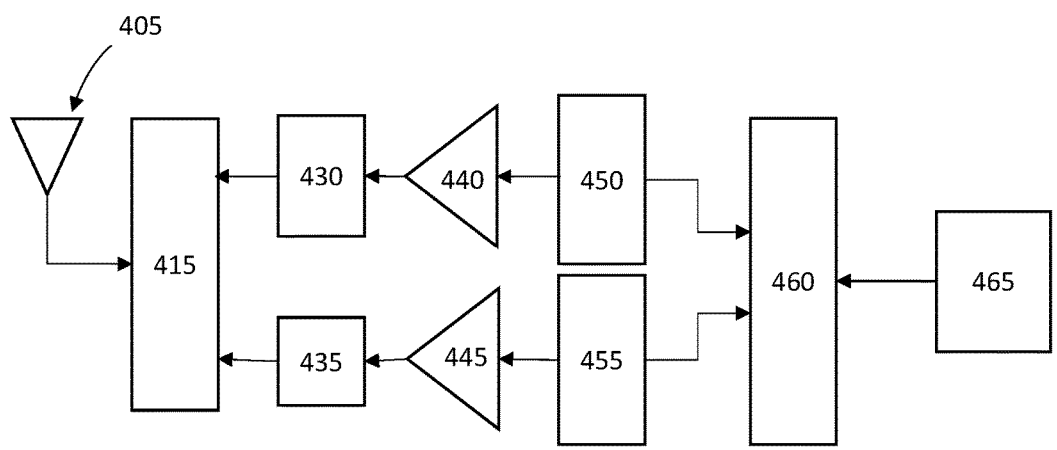
FIG. 4 shows an exemplary radio transmit architecture to implement software programmable cellular communication capability.

Turning now to FIG. 4, an exemplary radio transmit architecture 400 to implement software programmable cellular communication capability is shown. The radio transmit architecture 400 is an exemplary embodiment operable for uplink massive carrier aggregation and includes an antenna 405, an RF switch 415, a first multiplexer 430, a second multiplexer 435, a first wideband power amplifier 440, a second wideband power amplifier 445, a first combiner 450, a second combiner 455, a bank of sigma delta digital to analog converters (DAC) with bandpass filters 460 and a baseband processor 465. The baseband processor 465, which may be implemented using a DSP, prepares the individual component carrier baseband waveforms that are next fed through multiple tunable sigma delta DACs 460 to generate the component RF carriers. The waveforms are then passed through the FlexRF tunable bandpass filter banks 460 to reduce out of band emissions. Next, the component RF carriers are passed through a multiband power amplifier 440 445 in order to boost the power of each of the individual component carriers of a massive uplink carrier aggregation waveform. The power amplifier 440 445 bandwidth may not necessarily match the frequency breaks of the multiplexer architecture 430 435. For example, the power amplifiers 440 445 may have wider bandwidth, so there may be fewer required that those of the multiplexers 430 435. It may be operable such that the output from the tunable bandpass filters 460 being combined before being amplified en masse through one of more power amplifiers 440 445. Finally, the amplified RF signal carrying all the carrier aggregation waveforms are passed (through a signal splitter if necessary) to feed the individual multiplexer banks 430 435 before being piped via the RF switch 415 to the antenna 405 for transmission. The RF switch may be realized using a third combiner or the like.

Figure 5:
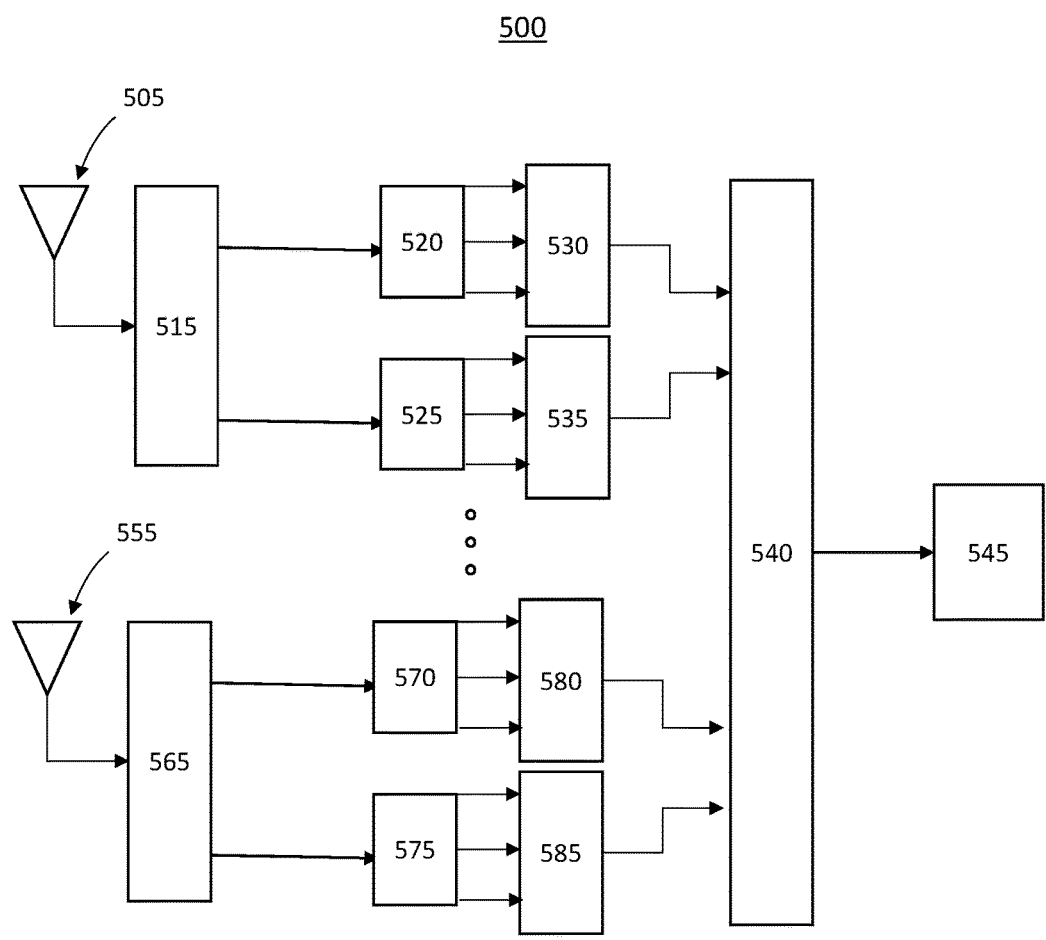
FIG. 5 shows an exemplary radio architecture for support multi-channel MIMO.

Turning now to FIG. 5, an exemplary radio architecture for support multi channel MIMO 500 is shown. The MIMO extension of the basic architecture described with respect to FIG. 3 may be to replicate the receive and transmit paths feeding into and out of the baseband chip in order to facilitate the increased number of MIMO channels. Each channel may have an antenna 505, an N-throw switch/splitter 515, a first multiplexer 520, a second multiplexer 525, a first bank of delta sigma analog to digital converters 530, a second bank of delta sigma analog to digital converters 535, a cross bar switch 540, and a processor 545, such as a baseband processor. Thus, the "N-th" channel would consist of "an N-th" antenna 555, "an N-th" N-throw switch/splitter 565, "an N-th" first multiplexer 570, "an N-th" second multiplexer 575, "an N-th" first bank of delta sigma analog to digital converters 580, "an N-th" second bank of delta sigma analog to digital converters 585, coupled to the cross bar switch 540, and the processor 545. In this exemplary embodiment, the MIMO waveforms may be independently captured, or transmitted, using separate RF channels and this architecture can be extended to cover as many MIMO channels as desired. The cross bar switch 540 may be replicated, or optimized to handle the multiple data streams in one fabric, based on power, size and practicality constraints. Furthermore, this architecture further offers the desirable advantage of further system optimization by reducing the components from a straight duplication of the receive/transmit chain and instead intelligently apportioning the multiplexer and sigma-delta branches in order that the desired number of MIMO channels are passed via independent signal paths to the baseband for processing. Some MIMO combinations may be achieved by having most of the other components remaining powered off and instead routing through either one of the active branches as a result of the tunable nature of the system elements.

Figure 6:
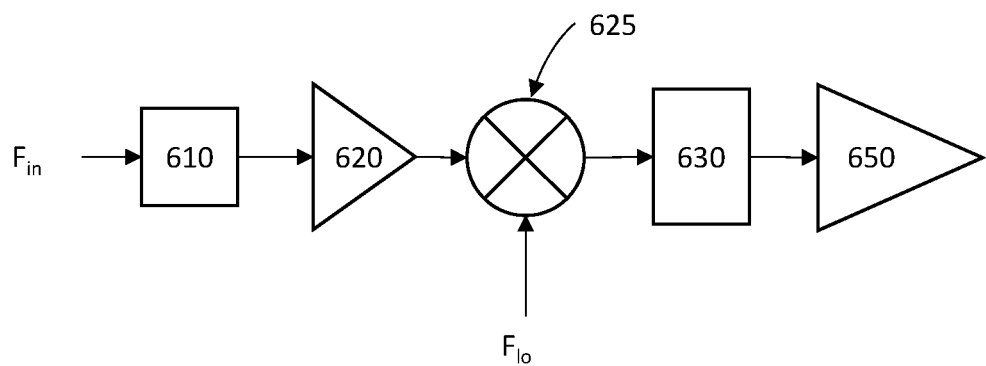
FIG. 6 shows an exemplary radio architecture for handling higher frequency waveform carrier frequencies.

Turning now to FIG. 6, a radio architecture for handling higher frequency waveform carrier frequencies 600 is shown. The extended range radio architecture may include a first filter 610, a low noise amplifier 620, a mixer 625, a fixed bandpass filter 630, and a sigma delta direct conversion receiver 650. For example, in order to handle higher input frequencies Fin waveform carrier frequencies above 3 GHz, the previously described architecture may be extended to incorporate wideband mixers for the receive chain to cover the extended range as needed. For example, if the exemplary tunable sigma-delta data converters operating up to 2.7 GHZ. For carrier waveforms beyond this range, a single stage mixer 625 can be used to downconvert into the range of these data converters, e.g. into a fixed low band (700-1100 MHz) range. It may only be required to downconvert the LTE waveform bandwidth, for example, 20 MHz, but may be extend to 100 MHz for contiguous multi channel carrier aggregation. A triplexer or fixed filter can select the band of interest, and a voltage controlled oscillator may be used to generate a appropriate local oscillator frequency $F_{lo}$ in order to tune for the appropriate frequency range to cover the entire 2.7 to 5 GHz. Range. For signal transmission, a second order harmonic of the sigma delta DAC may be used to transmit in the 2.7 to 5 GHz range. The tunable bandpass filters can operate up to and beyond this range, so the desired 2" harmonics may be filtered out, and fed into the appropriate power amplifiers for the 2.7 GHz to 5 GHz range.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. An apparatus comprising:
an antenna for receiving a first RF signal, a second RF signal, a third RF signal and a fourth RF signal;

a first bank of delta sigma analog to digital converters having a first delta sigma analog to digital converter for generating a first digital signal and a second delta signal analog to digital converter for generating a second digital signal;

a second bank of delta sigma analog to digital converters having a third delta sigma analog to digital converter for generating a third digital signal and a fourth delta signal analog to digital converter for generating a fourth digital signal;

a first multiplexer having a first passband and a second passband, wherein the first multiplexer is operative to couple the first RF signal to the first delta sigma analog to digital converter, where the first RF signal has a first center frequency within the first passband, and wherein the first multiplexer is further operative to couple the second RF signal to the second delta sigma analog to digital converter, where the second RF signal has a second center frequency within the second passband;

a second multiplexer having a third passband and a fourth passband, wherein the second multiplexer is operative to couple the third RF signal to the third delta sigma analog to digital converter, where the third RF signal has a third center frequency within the third passband, and wherein the second multiplexer is further operative to couple the fourth RF signal to the fourth delta sigma analog to digital converter, where the fourth RF signal has a fourth center frequency within the fourth passband;

a first switch for coupling the first RF signal and the second RF signal to the first multiplexer and for coupling the third RF signal and the fourth RF signal to the second multiplexer;

a processor for generating a communications data in response to at least one of the first digital signal, the second digital signal, the third digital signal and the fourth digital signal to the processor; and a second switch for coupling at least one of the first digital signal, the second digital signal, the third digital signal and the fourth digital signal to the processor.

2. The apparatus of claim 1 wherein the processor is a digital signal processor.

3. The apparatus of claim 1 wherein the communications data is used to control an autonomous vehicle.

4. The apparatus of claim 1 wherein the communication data is internet protocol data.

5. The apparatus of claim 1 wherein the communications data is voice data.

6. The apparatus of claim 1 wherein the first bank of delta sigma analog to digital converters are tunable in response to a control signal.

7. The apparatus of claim 1 wherein the second bank of delta sigma analog to digital converters are tunable in response to a control signal.

8. The apparatus of claim 1 wherein the first passband, second passband, third passband and fourth passband form a contiguous frequency band.

9. An apparatus comprising:
an input for receiving a first RF signal and a second RF signal;
a power amplifier for amplifying the first RF signal and the second RF signal;
a source of an LO signal;
a mixer for generating a first IF signal in response to the first RF signal and the LO signal and a second IF signal in response to the second RF signal and the LO signal;
a first delta sigma analog to digital converter to generate a first digital signal in response to the first IF signal;
a second delta sigma analog to digital converter to generate a second digital signal in response to the second IF signal; and
a multiplexer having a first passband and a second passband, wherein the multiplexer is operative to couple the first IF signal to the first delta sigma analog to digital converter, where the first IF signal has a first center frequency within the first passband, and wherein the multiplexer is further operative to couple the second IF signal to the second delta sigma analog to digital converter, where the second IF signal has a second center frequency within the second passband.

10. The apparatus of claim 9 further comprising a processor for decoding the first digital signal and the second digital signal to generate a communication data.

11. The apparatus of claim 10 wherein the communication data is used to control an autonomous vehicle.

12. The apparatus of claim 10 wherein the communication data is internet protocol data.

13. The apparatus of claim 10 wherein the communication data is voice data.

14. The apparatus of claim 9 wherein the first delta sigma analog to digital converter is tunable in response to a control signal.

15. The apparatus of claim 9 wherein the second delta sigma analog to digital converter is tunable in response to a control signal.

16. The apparatus of claim 9 wherein the first passband and the second passband form a contiguous frequency band.

* * * * *